United States Patent
Friederich et al.

(10) Patent No.: US 6,213,833 B1
(45) Date of Patent: Apr. 10, 2001

(54) FLOAT FOR BUOYANT HOSES

(75) Inventors: Hans-Werner Friederich, Winsen; Uwe Maass, Hamburg, both of (DE)

(73) Assignee: Phoenix Aktiengesellschaft, Hamburg (DE)

( * ) Notice: Subject to any disclaimer, the term of this patent is extended or adjusted under 35 U.S.C. 154(b) by 0 days.

(21) Appl. No.: 09/485,744
(22) PCT Filed: Nov. 6, 1998
(86) PCT No.: PCT/DE98/03234
  § 371 Date: Feb. 15, 2000
  § 102(e) Date: Feb. 15, 2000
(87) PCT Pub. No.: WO99/26006
  PCT Pub. Date: May 27, 1999

(30) Foreign Application Priority Data

Nov. 14, 1997 (DE) ............................................... 197 50 369

(51) Int. Cl.[7] ........................................................ B63B 22/00
(52) U.S. Cl. .............................................. 441/133; 138/103
(58) Field of Search ...................................... 441/133, 134; 114/230; 405/162, 171; 138/103, 104, 137, 141

(56) References Cited

U.S. PATENT DOCUMENTS 3,811,477 * 5/1974 Thawley ................................. 138/103
4,000,759 * 1/1977 Higbee ................................... 138/130
4,506,622 * 3/1985 Linehan et al. ....................... 114/230
4,764,137 * 8/1988 Schulte ................................... 441/133

FOREIGN PATENT DOCUMENTS 2 203 957   5/1974 (FR) .
96 01385    1/1996 (WO) .

* cited by examiner

Primary Examiner—Jesus D. Sotelo
(74) Attorney, Agent, or Firm—Collard & Roe, P.C.

(57) ABSTRACT

The invention relates to a float (2) for buoyant hoses comprising at least one multi-layer foam body which surrounds the buoyant hose (1), whereby the foam body is composed of individual foam sheets (3, 4, 5). Inside a layer, a radial connection (6) is produced which adheringly joins two adjacent foam sheets (3, 4) to one another. In addition, the float comprises an axial connection (7) which also adheringly joins two adjacent foam sheets (3, 5) to one another from sheet to sheet. According to variant A, the radial connection (6) is exclusively produced by a layer made of a polymer material which expands when heated and occupies a large volume. According to variant B, both the radial connection (6) as well as the axial connection (7) are produced by a layer made of a non-expandable polymer material, whereby the individual layers are joined to one another for the radial and axial connection in such a way that each foam sheet (3, 4, 5) is completely single chambered.

10 Claims, 1 Drawing Sheet

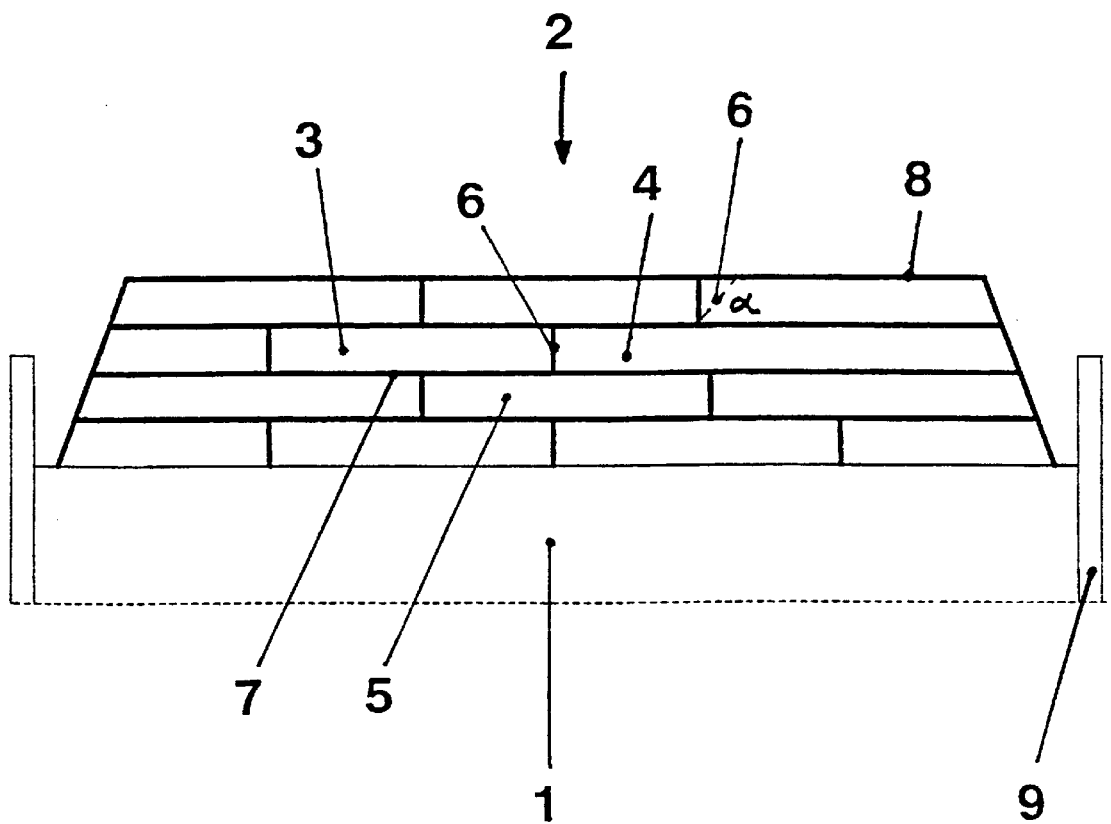

FLOAT FOR BUOYANT HOSES

The invention relates to a float for buoyant hoses comprising at least one multi-layer foam body surrounding the buoyant hose, whereby the foam body is composed of individual foam sheets, forming a radial connection, which, within one layer, adheringly joins two adherent foam sheets to one another. In addition, the float comprises an axial connection, which, from sheet to sheet, adheringly joins to adjacent foam sheets to each other as well (WO-A-96/01385).

Floating hoses are produced with integrated buoyant bodies or individual buoyant bodies made of plastic. Foam materials with closed pores are employed for hoses with integrated buoyant bodies, as a rule. For building up the buoyant body on the hose, foam sheets are glued or fused to the hose in most cases.

The technology of jointing by gluing or welding, however, is afflicted with a number of drawbacks. The drawback with a glued joint is that very much solvent is released in the gluing process. The method of gluing, as also the method of welding between the individual foam sheets in the axial direction poses no problems, as a rule. However, the connections in the radial direction must be capable of withstanding the tensile or compression forces that occur when a buoyant hose is bent. Stress peaks occurring in the presence of such forces will time and again lead to fractures. When the outer skin is damaged, water penetrates into these destroyed cavities and deteriorates the property of buoyancy of the buoyant hose.

Now, the problem of the invention consists in providing a floating body for buoyant hoses in connection with which the problems outlined above will no longer occur, namely under the aspect of trouble-free long-term utilization.

The problem is solved by Variation A or Variation B. The two variations are explained in greater detail in the following.

Variation A:

According to this variation, exclusively the radial connection is produced by a layer consisting of a polymeric material, which expands when heated, and occupies a large volume. In the course of vulcanization, said polymer layer is joined with the foam sheets. Since the foam material of said sheets is capable of shrinking during the vulcanization process, the cavity forming in connection with the radial connection is filled at the spliced joints by the material expanding under heat.

With such a highly effective radial connection, it is readily possible to employ the known jointing technology of welding or gluing when the axial connection is produced.

Advantageously, however, the axial connection is additionally formed by a layer consisting of a non-expandable material, whereby the individual layers for the radial and axial connections are joined with each other in such a way that each foam sheet is completely chambered in. In the event the outer skin gets damaged, the water can penetrate only one chamber in this way, or just a few chambers. This means that the floating property is influenced only minimally. The consequence thereof is that the buoyant hose has a longer useful life, and, therefore, can be employed for a longer time.

Variation B:

According to this variation, both the radial and the axial connection are formed by a layer consisting of a non-expandable polymer material, whereby the individual layers for the radial and axial connections are joined with one another in such a way that each foam sheet is completely chambered in. In the event the outer skin gets damaged, the consequence is the same as stated above.

Irrespective of the two variations, the following material-specific aspects usefully apply:

The foam sheets consist of polyethylene PE), polyurethane (PU), polypropylene (PP), polystyrene (PS), or polyvinyl chloride (PVC).

The polymer material for the radial and axial connections is in each case a rubber mixture based on ethylene-propylene-diene copolymer (EPDM), or a blend of EPDM with natural rubber (NR), and/or with styrene-butadiene rubber (SBR), preferably in connection with a foam sheet consisting of PE or PP.

The polymer material for the radial and axial connections is in each case a rubber mixture based on polyurethane (PUR; brief designation for polyurethane elastomers), or a blend of PUR with nitrile rubber (NBR), preferably in connection with a foam sheet consisting of PU (brief designation for polyurethane foam materials).

The polymer material for the radial and axial connections is in each case a rubber mixture based on SBR, or a blend of SBR with EPDM and/or NR, preferably in connection with a foam sheet consisting of PS.

The polymer material for the radial and axial connections is in each case a rubber mixture based on NBR, or a blend of NBR with PVC, preferably in connection with a foam sheet consisting of PVC.

The materials specified above for the radial and axial connections are elastomers or thermoplastic elastomers. Said materials, therefore, provide said connections with elastic properties, which additionally contribute to a prolonged useful life of the floating bodies.

Commercially available expanding agents are employed in connection with the expandable polymer materials for the radial connection according to variation A. Said expanding agents are in particular substances which, when heated, form gaseous particles, and thus cause the polymer material to foam.

Now, the invention is explained in greater detail in the following with the help of an exemplified embodiment and by reference to a schematic drawing (representation of a longitudinal section), namely in connection with the following list of reference numerals:

1 Buoyant hose
2 Float
3 Foam sheet
4 Foam sheet
5 Foam sheet
6 Radial connection
7 Axial connection
8 Outer skin
9 Flange.

According to said drawing, the float 2 consists of a multi-layer foam body surrounding the buoyant hose 1. Said foam body is composed of the individual foam sheets 3, 4 and 5, forming a radial connection 6, which, within a layer, adheringly joins two adjacent foam sheets 3 and 4 to one another. Furthermore, an axial connection 7 is formed, which also adheringly joins two adjacent foam sheets 3 and 5 to one another from sheet to sheet.

Reference is made to what has been stated above with respect to the radial connection 6 and the axial connection 7 as defined by the invention. However, the following has to be noted supplementarily to the aforegoing:

The radial connection 6 and the axial connection 7 each have a minimum layer thickness of 0.5 mm.

The radial connection 6 has an angle $\alpha$ of 45° to 90° C. based on the axial connection 7.

The float 2 is provided with an outer skin 8 in most cases, said skin consisting of an elastomer, a thermoplastic elastomer, or a thermoplastic. Reference is made in this respect, and also as concerns any additional measures that may be required, to the published document WO-A-96/1385, which addresses the prior art of floats for buoyant hoses in great detail.

As a rule, the buoyant hose 1 is also equipped with the flanges 9 located at the ends. Larger offshore installations are produced by lining up such buoyant hoses in rows.

What is claimed is:

1. A floating body (2) for buoyant hoses, comprising at least one multi-layer foam body surrounding a buoyant hose, whereby the foam body is composed of individual foam sheets (3,4,5), forming a radial connection (6) which, within a layer, adheringly joins two adjacent foam sheets (3, 4) with each other, as well as forming an axial connection (7) also adheringly joining two adjacent foam sheets (3, 5) with each other from sheet to sheet; characterized in that exclusively the radial connection (6) is formed by a polymer material expanding when heated and occupying a larger volume.

2. The float according to claim 1, characterized in that the axial connection (7) is additionally formed by a layer consisting of a non-expandable material, whereby the individual layers for the radial and axial connections are joined with each other in such a way that each foam sheet (3, 4, 5) is completely chambered in.

3. The float according to claim 1, characterized in that the foam sheets (3, 4, 5) are of a material selected from the group consisting of polyethylene (PE), polyurethane (PU), polypropylene (PP), polystyrene (PS), and polyvinyl chloride (PVC).

4. The float according to claim 1, characterized in that the polymer material for the radial connection (6) and the axial connection (7) is in each case a rubber mixture selected from the group consisting of ethylene-propylene-diene copolymer (EPDM), a blend of EPDM with natural rubber (NR), a blend of EPDM, NR with styrene-butadiene rubber (SBR) and SBR.

5. The float according to claim 1, characterized in that the polymer material for the radial connection (6) and the axial connection (7) is in each case a rubber mixture selected from the group consisting of polyurethane (PUR) and a blend of PUP with nitrile rubber (NBR).

6. The float according to claim 1, characterized in that the polymer material for the radial connection (6) and the axial connection (7) is in each case a rubber mixture selected from the group consisting of SBR, a blend of SBR with EPDM, a blend of SBR, EPDM and NR and a blend of SBR with NR.

7. The float according to claim 1, characterized in that the polymer material for the radial connection (6) and the axial connection (7) is in each case a rubber mixture selected from the group consisting of NBR and a blend of NBR with PVC.

8. The float according to claim 1, characterized in that the radial connection (6) and the axial connection (7) each have a minimum layer thickness of 0.5 mm.

9. The float according to claim 1, characterized in that the radial connection (6) has an angle $\alpha$ of 45° to 90° C. based on the axial connection (7).

10. A float (2) for buoyant hoses, comprising at least one multi-layer foam body surrounding a buoyant hose (1), whereby the foam body is composed of individual foam sheets (3, 4, 5), forming a radial connection (6) adhesively joining within a layer two adjacent foam sheets (3, 4) to one another, as well as forming an axial connection (7) also adhesively joining two adjacent foam sheets (3, 5) to each other from sheet to sheet; characterized in that both the radial connection (6) and the axial connection (7) are formed by a layer consisting of a non-expandable polymer material, whereby the individual layers for the radial and axial connections are joined with each other in such a way that each foam sheet (3, 4, 5) is completely chambered in.

* * * * *